United States Patent [19]

Heng et al.

[11] Patent Number: 4,832,439
[45] Date of Patent: May 23, 1989

[54] DEVICE FOR RAPIDLY FIXING A TUBULAR ELEMENT IN AN APPARATUS HOUSING, AND A TERMINAL BLOCK FOR OPTICAL FIBERS INCLUDING SUCH A DEVICE

[75] Inventors: Jean-Paul Heng, Lyon; Marcel Jusseau, Villeurbanne; Alain Humbert-Labeaumaz, Bron, all of France

[73] Assignee: CGEE Alsthom, France

[21] Appl. No.: 102,709

[22] Filed: Sep. 30, 1987

[30] Foreign Application Priority Data

Sep. 30, 1986 [FR] France ............................. 86 13610

[51] Int. Cl.⁴ .............................................. G02B 6/38
[52] U.S. Cl. ................................................ 350/96.21
[58] Field of Search ................ 350/96.20, 96.21, 96.22

[56] References Cited

U.S. PATENT DOCUMENTS

| | | |
|---|---|---|
| 4,422,715 | 12/1983 | Williams et al. ................. 350/96.20 |
| 4,466,682 | 8/1984 | Jusseau et al. ..................... 339/97 R |
| 4,556,282 | 12/1985 | Delebecque ................. 350/96.22 X |

FOREIGN PATENT DOCUMENTS

| | | |
|---|---|---|
| 2502445 | 4/1983 | France . |
| 2516711 | 5/1983 | France . |
| 2034069 | 5/1980 | United Kingdom ............. 350/96.21 |
| 2042284 | 9/1980 | United Kingdom . |

Primary Examiner—John D. Lee
Assistant Examiner—Phan T. Heartney
Attorney, Agent, or Firm—Sughrue, Mion, Zinn, Macpeak & Seas

[57] ABSTRACT

A rapid fixing device for a tubular element, in particular for the housing (1) of an optical fiber terminal block. The tubular element penetrates into the housing (1) along an inlet duct (9A3, 9A4, 9A5) in which it is fixed by a moving member (2) having a clamping slot, the moving member being movable in translation along a guide (10A1) which intersects the inlet duct. The device includes an arrangement for displacing the moving member under the effect of partial axial rotation of the blade of a tool (19) of the screwdriver type. Two operating ducts, one in the housing and the other in the moving member co-operate to convert the rotary movement of the tool into translation movement of the moving member.

9 Claims, 4 Drawing Sheets

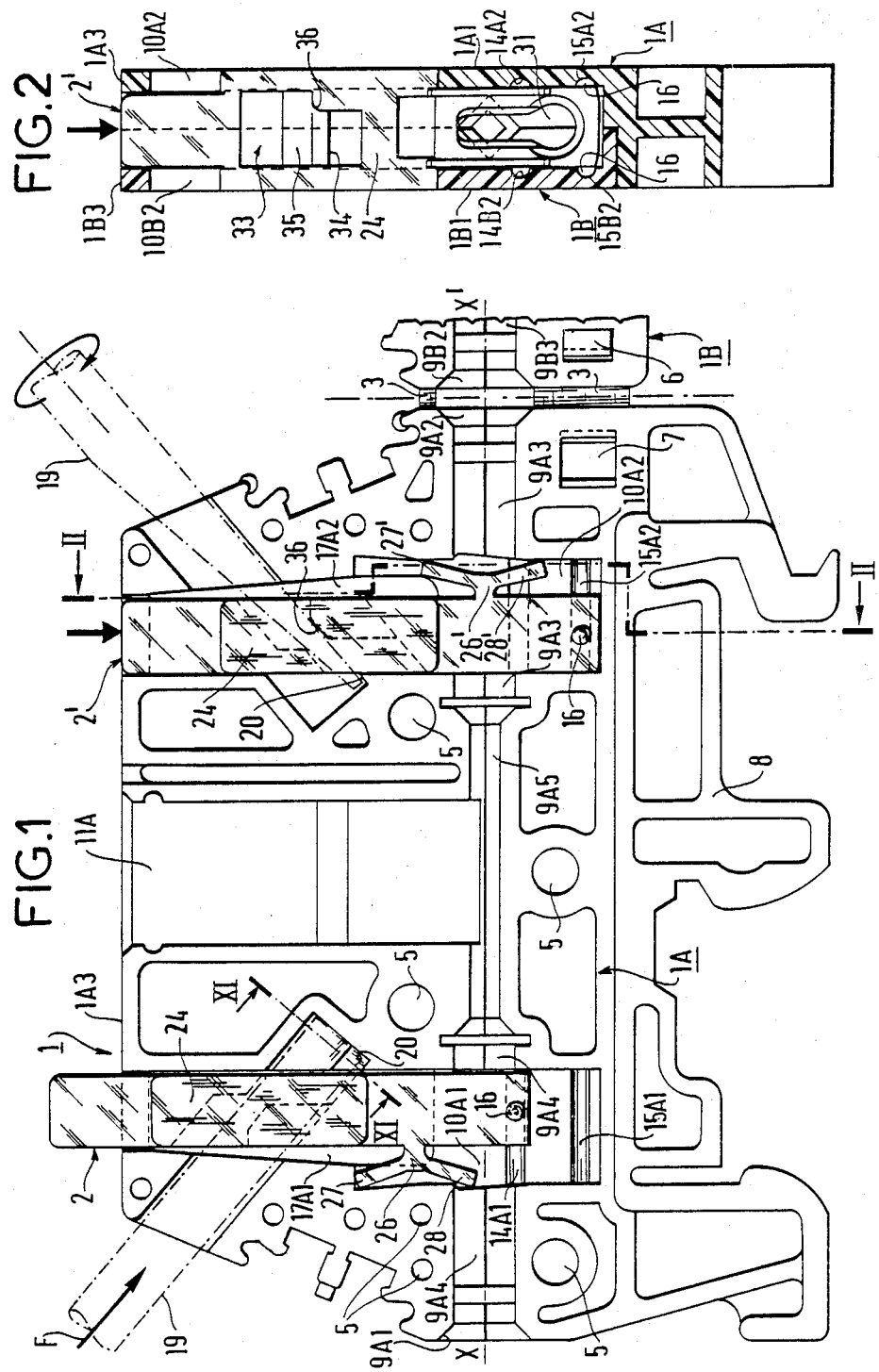

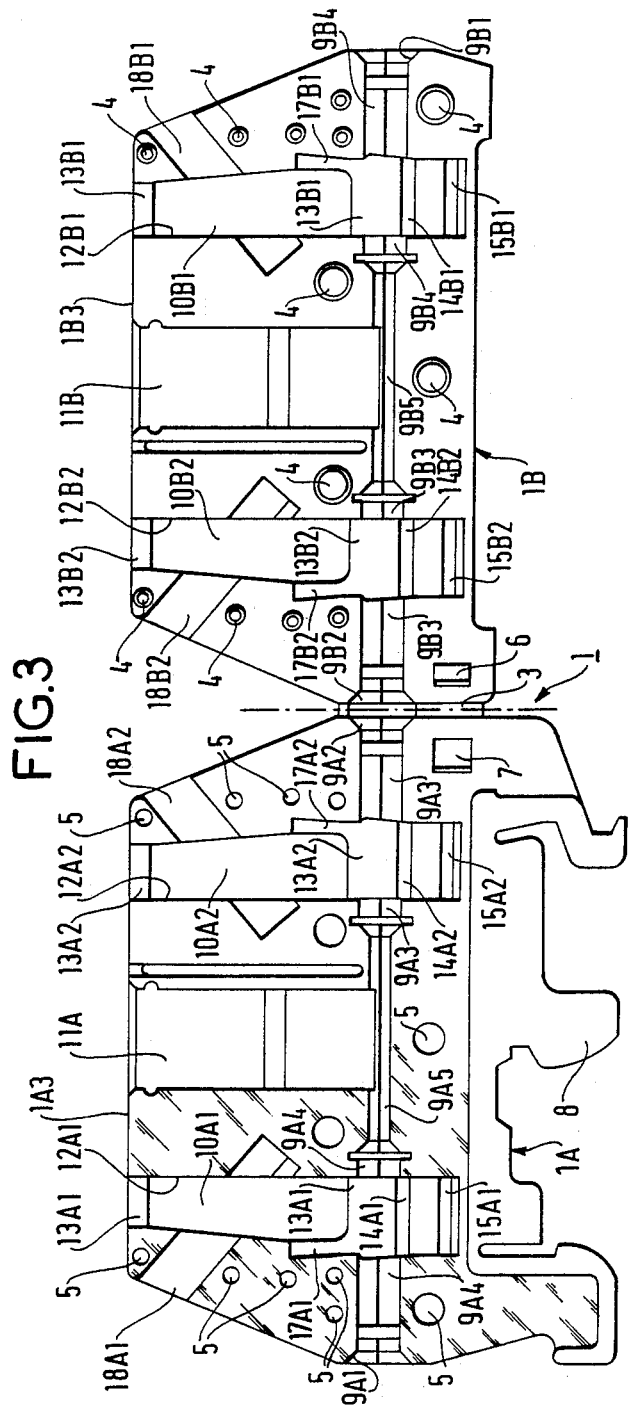

FIG.5 FIG.6 FIG.7
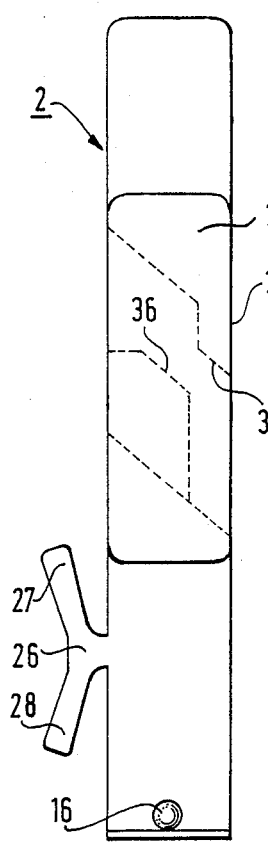
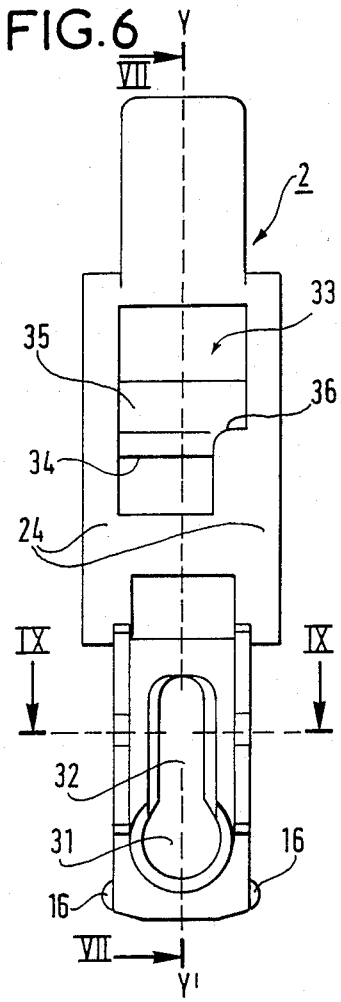
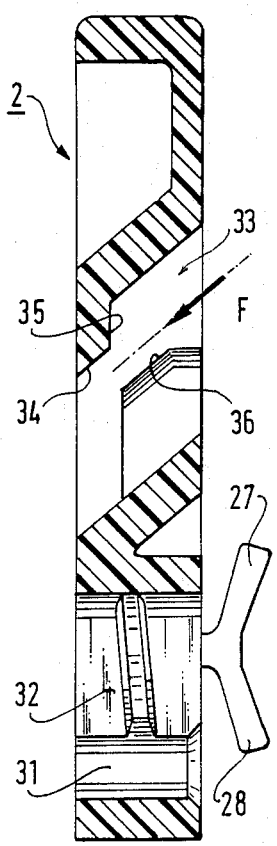
FIG.8 FIG.9
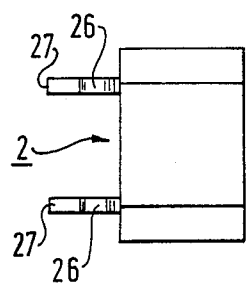
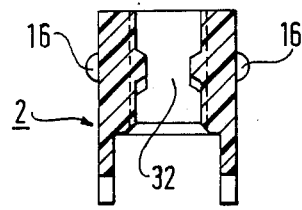

DEVICE FOR RAPIDLY FIXING A TUBULAR ELEMENT IN AN APPARATUS HOUSING, AND A TERMINAL BLOCK FOR OPTICAL FIBERS INCLUDING SUCH A DEVICE

The present invention relates to a device for rapidly fixing a tubular element, such as an end length of an optical fiber, an electric wire, or a small pipe, in an apparatus to which said tubular element is to be connected, for example. The invention also relates to an apparatus housing of the terminal block type for use with optical fibers and including such a device.

BACKGROUND OF THE INVENTION

Fixing a tubular element as mentioned above in an apparatus for the purposes of connection or at least of support is a well-known problem for which numerous solutions have already been devised. However, because of new particular problems the search continues to obtain new fixing devices which are simple and cheap and for which manufacture, assembly, correct installation, and manipulation are easy and can be performed rapidly.

One family of solutions provides for the tubular element to be fixed in a duct in the apparatus by means of a member provided with a slot in which the tubular element is clamped transversely. In this family of solutions, at least one of the two components comprising the slotted member and the portion of the apparatus including the duct is displaced relative to the other during fixing by clamping.

For reasons to do with the necessary clamping pressure and with ease of access to perform the fixing displacement, an ordinary, small hand tool, such as a screwdriver is often used for transmitting a large force by a simple movement, e.g. by the lever effect or by screwing.

Displacement obtained by the lever effect has the drawback of requiring room for the tool to be rocked and this is not always compatible with the environment in which the apparatus fixing device is to be found, whereas displacement by screwing suffers the drawback of taking a relatively long time to perform and thus of increasing the risk that a fixing operation will not be properly finished, particularly if the operation requires a series of maneuvers.

SUMMARY OF THE INVENTION

The present invention therefore provides a device for rapidly fixing a tubular element in an apparatus housing into which the tubular element penetrates via a fixed inlet duct which positions it in the housing, and in which it is fixed by the action of a slotted moving membe which overlaps it in such a manner as to wedge it inside the slot when said moving member is displaced within a guide which passes through the inlet duct from an initial position enabling the tubular element to slide along the inlet duct to a final position in which the tubular element is fixed inside the housing by being clamped in the slot which is oriented transversely to the inlet duct.

According to a characteristic of the invention, the fixing device includes an arrangement for displacing the moving member in translation along its guide under the effect of partial axial rotation of the blade of a tool of the screwdriver type having a rectangular cross-section, said arrangement including two ducts for passing the blade of the tool, said ducts being referred to as "first" and as "second" operating ducts, with the second duct being provided through the moving member which is of the slide type and with the first duct being provided through the housing from an external orifice enabling said tool blade to be inserted through both operating ducts which enable the tool blade to press sideways against different portions of the inside wall of each of them as a function of the axial rotation position of the blade, in such a manner that the sideways thrust of the blade on an internal wall portion of each of the two operating ducts causes the two wall portions concerned to move apart and thereby gives rise to translation of the moving member in one direction or the other whenever an axial rotaary torque is applied to the tool blade, and in the same direction as said torque.

BRIEF DESCRIPTION OF THE DRAWINGS

An embodiment of the invention is described by way of example with reference to the accompanying drawings, in which:

FIG. 1 is a view of two joinable halves of an optical fiber terminal block equipped with two rapid fixing devices in accordance with the invention.

FIG. 2 is a section on II—II of a fitted optical fiber terminal block with its two halves joined.

FIGS. 3 and 4 show the terminal block of terminals 1 and 2 in the open position, respectively as a side view showing the inside, and as a view from above.

FIGS. 5, 6, and 7 are respectively a right-hand view, an end view, and a left-hand view in section on VIII—VIII of a slotted moving member in accordance with the invention.

FIGS. 8 and 9 are respectively a plan view and a cross-section on IX—IX of the moving members shown in the three preceding figures.

MORE DETAILED DESCRIPTION

Figure 10:
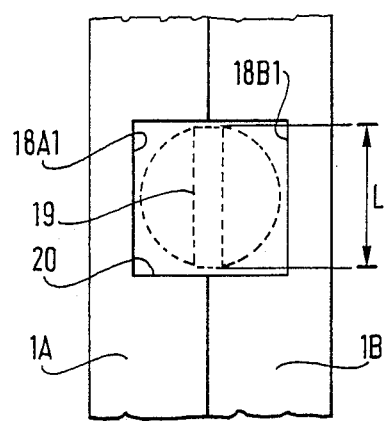
FIGS. 10 and 11 are respectively a view along F of the opening to a first operating duct, and a section on XI—XI of a second operating duct.

The rapid fixing device of the present invention is shown in the context of an application for fixing optical fibers in a terminal block analogous to blocks used for electric wires, such as the electrical terminal block described in the applicant's French Pat. No. 2 502 445.

This rapid fixing device is also applicable to fixing electric wires for support or connection purposes and to fixing small pipes.

In the example shown in FIGS. 1 and 2, two rapid fixing devices are associated in a common housing 1 of an optical fiber terminal block.

The housing 1 is made of molded insulating material and is constituted in this case by two joinable halves 1A and 1B whose structure is shown in greater detail in FIGS. 3 and 4. The housing contains, in particular, two moving members 2 and 2' which are mounted in different positions, these moving members constituting one of the essential component parts of rapid fixing devices in accordance with the invention.

In this case, the housing 1 comprises two halves 1A and 1B which are slightly dissimilar and which are interconnected by an integrally molded side hinge 3, which hinge 3 enables the inside face of the half 1B—visible in FIGS. 1 and 3—to be applied against the inside face of the half 1A—also visible in said figures.

The two halves 1A and 1B are conventionally snap-fitted together by means of studs 4 and complementary holes 5 distributed around the inside faces of the halves 1A and 1B, and/or by at least one flexible latch 6 fixed to one of the halves and engaging behind a catch in a snap-fastening recess 7 in the other half.

In the example shown, the housing 1 is suitable for being positioned on a support bar (not shown) by means of a fixing leg 8 which may be an add-on item as defined, in particular, in the applicant's French Pat. No. 2 184 215, or which may be integrally molded with the remainder of the housing, with the leg being mounted, in this case, on the half 1A.

A central fiber-inlet duct 9 passes longitudinally right through the housing 1 of the optical fiber terminal block. This duct is constituted by half-ducts each belonging to a different one of the halves of the block and having their concave surfaces facing each other.

In the embodiment shown, the cross-section of the block is at least approximately rectangular as can be seen in FIG. 2. Each half-duct is rectilinear and runs parallel to the long outside wall 1A1 or 1B1 of the half in which it is included.

The optical fibers to be connected are not shown in the drawings, and each of them is assumed to be conventionally constituted by a cylindrical core covered in a likewise cylindrical sheath with the cores and the sheaths of the two optical fibers to be connected having the same diameters respectvely.

The inlet duct 9 comprises two successive elements, which may be cylindrical for example, which are centered on a common longitudinal axis XX' and each of which is respectively split into two complementary half-elements which join on either side of a mid "join" plane of the assembled housing 1, said plane being parallel to the large outside walls 1A1 and 1B1 of said housing 1 when assembled.

The inlet duct 9 includes an opening at each of its two ends, a receptacle for the fiber sheath placed after each opening, and a middle receptacle situated between the sheath receptacles serving to align the cores of the two fibers to be connected end-to-end.

In order to facilitate optical fiber insertion, each of the openings that open to the outside of the housing comprises two half truncated pyramids or cones each belonging to a different one of the two housing halves, e.g. 9A1 & 9B1 and 9A2 & 9B2.

Each sheath receptacle is intended to accurately position an optical fiber sheath transversely and comprises two complementary hollow half-elements, for example half-cylinders or two V-grooves, each provided in a different housing-half, e.g. 9A3 & 9B3 and 9A4 & 9B4.

Each of the two sheath receptacles is transversely intersected by a respective guide 10A1-10B1 or 10A2-10B2 for the purpose of enabling a sliding type moving member 2 or 2' to cross through the sheath receptacle.

The middle receptacle which is common to the two optical fiber cores to be interconnected is likewise constituted by two complementary hollow half-elements, e.g. two half-cylinders or two V-grooves, intended to provide accurate alignment of the cores of the two optical fibers, such as half-elements 9A5 and 9B5.

In the embodiment shown, a well extends transversely and ends in the central zone of the common middle receptacle 9A5-9B5 in order to make it possible to verify that the cores of the optical fibers have been properly interconnected in said central zone. The well is constituted by two complementary transverse hollows 11A and 11B each formed in a corresponding one of the housing halves in such a way as to open out to the outside of the housing, in the present case to the top thereof as constituted by the joined top portions 1A3 and 1B3 of the two halves 1A and 1B (FIG. 2).

Two guides 10A1-10B1 and 10A2-10B2 are provided for the moving members 10 and 10' and in this case they are in the form of two elongate cavities extending parallel to the well 11A-11B and are disposed on either side thereof in the assembled housing 1.

Each of these two cavities is constituted by two complementary hollows which are symmetrical in this case about the middle join plane of the portions 1A and 1B, with the hollows being intended to guide the moving members in translation.

To this end, each guide includes a bearing face against which the relevant moving member 2 or 2' is pressed, said face being constituted by two joining coplanar bearing surfaces carried by respective ones of the halves 10A and 10B, e.g. the bearing face constituted by surfaces 12A1 and 12B2 for guide 10A1-10B1. In this case, the two faces 12A1-12B1 and 12A2-12B2 are placed back-to-back on either side of the well 11A-11B.

Each of the bearing faces 12A1-12B1 or 12A2-12B2 is enclosed between two mutually parallel guide edges which are perpendicular thereto and each of which belongs to a different one of the housing halves 1A and 1B, e.g. edges 13A1 and 13B1 for the guide 10A1-10B1.

In the embodiment chosen, each guide opens out through the two joiniing top portions 1A3 and 1B3 of the housing, thereby enabling the osition occupied by the moving member 2 or 2' contained in the guide to be visually inspected.

In this case, each of the guide edges is provided with two superposed transverse grooves which are separated by a distance equal to the normally authorized stroke of a moving member, e.g. grooves 14A1 and 14A2 in guide edge 13A1. These grooves co-operate, for this purpose, with projections 16 carried by the bases of the moving members in order to mark the authorized limit positions of these members and in order to hold them therein.

Figure 13:
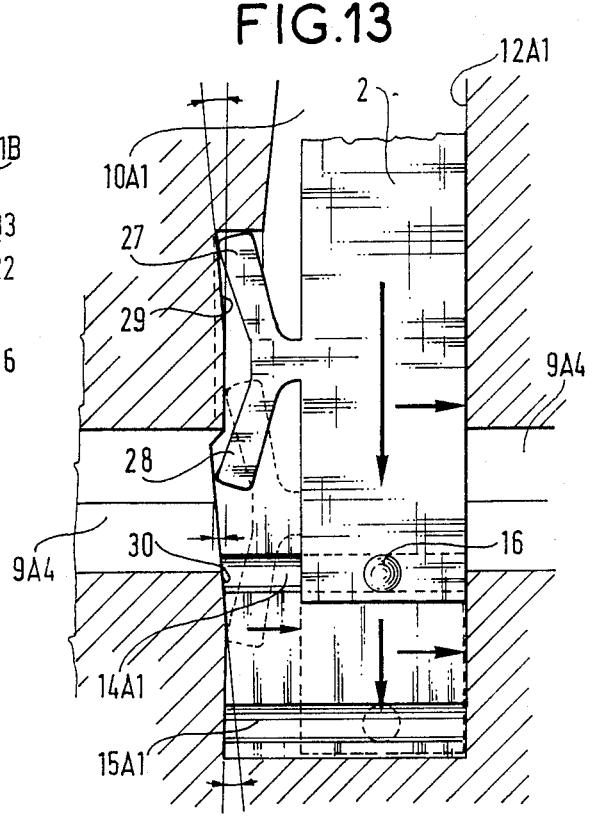
FIG. 13 is a view of the moving member as shown in FIG. 7 in position in its guide inside one of the halves of the housing for an optical fiber terminal block.

A pressing hollow such as 17A1-17B1 is provided on the opposite side to the bearing face at the bottom of the cavity of each guide and is constituted by joining two half-hollows, in this case 17A1 and 17B1 belonging to the two joining halves 1A and 1B, with the constitution and functions of this hollow being described below with reference to FIG. 13.

Each guide 10A1-10B1 or 10A2-10B2 has a duct referred to as the first operating duct passing therethrough in order to allow the rectangular section blade of a tool (e.g. a screwdriver) to pass therethrough, see FIG. 1.

Each first operating duct comprises two half-ducts belonging to respective ones of the halves 1A and 1B, e.g. the second duct 18A1-18B1 comprises half-ducts 18A1 and 18B1.

In a preferred embodiment of the invention, the axes of the first operating ducts are copolanar with the axes of the guides and with the axis XX' of the inlet duct lying in the mid join plane of the housing 1.

Each first operating duct is inclined relative to the bearing face of the guide through which it passes and it extends on either side of said guide, as can be seen in FIGS. 1 and 3.

In the embodiment shown, the orifice of each first operating duct is designed to limit the width of the screwdriver blade to a predetermined maximum width "L" (FIG. 10) and to enable a screwdriver of that width to be rotated therein. In the example shown, each first operating duct is square in its section lying in a zone between its orifice and the guide through which it passes, with the half-ducts such as half-ducts 18A1 and 18B1 having complementary U-shaped cross-sections (FIG. 10).

The blind portion at the end of a first operating duct situated on the opposite side of the associated guide relative to the opening to the housing has a cross-section capable of being inscribed in a square of the same size as the above-mentioned cross-section, without itself being square. It is designed to allow the blade of a tool 19 inserted therein to turn through no more than one-quarter of a turn.

Figure 11:
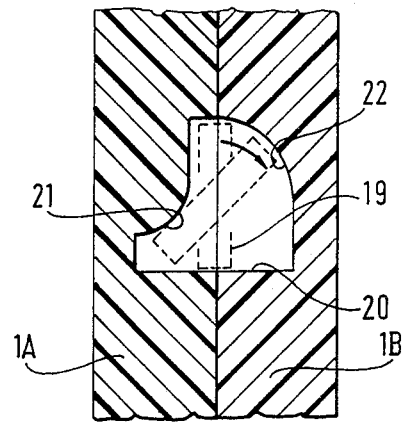

To this end, the cross-section of said blind portion (at least over a portion of its length) has the shape shown in FIG. 11, with:

a plane bearing surface 20 having a transverse extent which is slightly greater than "L" in order to allow the blade of the tool 19 to press flat thereagainst;

a central zone which is perpendicular to said plane bearing surface 20 and which has the same extent running from the middle of said plane bearing surface so as to enable the blade of the tool 19 to be positioned with its flap perpendicular to the plane portion 20, and in the middle thereof; and two rounded zones comprising a convex zone 21 and a concave zone 22 enabling the blade of the tool to pass progressively by axial rotation from the flat position to the above-defined perpendicular position, and vice-versa, without removing the blade of the tool 19 from the end of the first operating duct.

The moving members 2 and 2' in the same terminal block housing 1 are preferably identical and are described in greater detail below with reference to FIGS. 5 to 9, and 13.

Each of the moving members is of the slide type and is designed to move in translation along its guide, e.g. the moving member 2 which is shown in its initial position in guide 10A1-10B1 or moving member 2' which is shown in its final position in guide 10A2-10B2 (FIG. 1).

Each moving element bears against a bearing face of the guide such as 12A1 by means of a wall 23 which is level with two longitudinal shoes 24 situated on either side of the central body 25 of said moving element and sliding in two hollows which open out in this case in the guides on either side of the housing 1 and which limit the translation stroke of the moving member which they partially contain.

In the embodiment shown, the wall 23 of a moving member is pressed against the bearing face by the action of a pusher device 26 which is made on the face of the moving element opposite to the wall 23.

Figure 12:
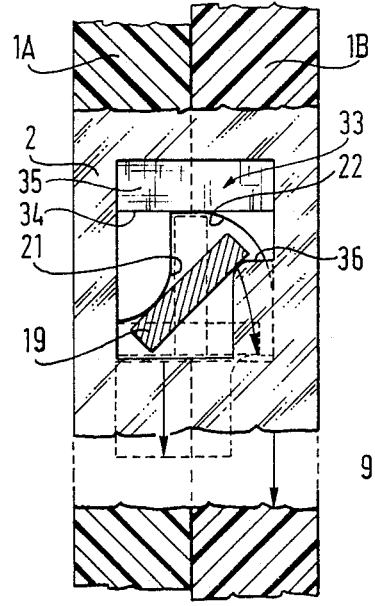
FIG. 12 is an explanatory diagrammatic view along F level with the face carrying the resilient tabs of the moving member at the opening to the second duct.

This pusher device 26 is placed, in this case, in the zone of the moving member 2 which is received in the end of the guide, and comprises two pairs of resilient tabs 27 and 28 for bearing against one of the walls of a pressing hollow such as 17A1-17B1 provided on one side of the end of the guide. The wall of this end is provided, for example, with two sloping ramps 29 and 30 each followed by a flat against which the resilient tabs of the pusher device press in such a manner that thrusting the moving member towards the end of the guide increases the pressure applied by said moving member against the bearing wall, in this case 12A1, by virtue of the increased thrust from the tabs (FIG. 12).

The end of the moving member penetrating to the end of the guide is provided, in this case, with a transverse fiber-passing duct 31 which is aligned with the axis of the sheath receptacle, such as 9A4-9B4, which passes through the moving member including it when said moving member is placed in its initial position at the top of the guide and enables a fiber to penetrate into said fiber-passing duct 31.

Thereabove there is a fiber sheath clamping slot 32 disposed transversely to its axis and slightly inclined so that the insertion of the moving member on which they are mounted into the moving member guide tends to drive the fiber by means of its sheath towards the bearing face, e.g. 12A1, against which said moving member is pressed by the resilient device 26.

The width of the clamping slot 32 is selected in conventional manner to fix a fiber of given diameter.

The clamping slot 32 has a duct 33 thereabove for passing the blade of the tool 19. This duct is referred to below as the second operating duct 33 and it passes obliquely through the slide in a direction which is practically parallel to the direction of the first operating duct such as 18A1-18B1 which passes through the guide receiving the moving member 2 including said second operating duct.

The second operating duct co-operates with the corresponding first operating duct to enable the moving member in which it is made to move along its guide between the translation limit positions fixed by the grooves such as 14A1 and 15A1.

To this end, each second operating duct 33 includes at least one inside plane bearing surface 34 (see FIGS. 6 and 7) which takes up a position parallel to and facing the plane bearing surface 20 at the end of the first operating duct associated with the guide in which the moving member including the second operating duct under consideration itself moves. This makes it possible, when the moving member is fully retracted in the housing, as at 2' to the right of FIG. 1, to insert the blade of a tool 19 flatly so that it bears via one face against the plane bearing surface 20 on either side of the guide under consideration and via its other face against the plane bearing surface 34.

Each second duct 33 also includes a convex bearing surface 36 made opposite the convex bearing surface 21 included in the first duct in such a manner that these two bearing surfaces apply against opposite sides of the blade of a tool 19 inserted sideways on up to the end of the first duct. The first moving member then projects beyond the housing, as shown at 2 to the left of FIG. 1.

In the embodiment shown, the convex bearing surfaces 21 and 35 are on two opposite sides of the roughly square section tube formed by the two operating ducts of the same fixing device when the two plane bearing surfaces 20 and 34 correspond to the other two sides of the square.

The direction of rotation of the blade of the tool 19 is determined by the shape of the end of the first operating duct and by respective positions of the bearing surfaces 20 & 34 and 21 & 36. A facet 35 provided in the second duct 33 acts in conjunction with the plane bearing surface 20 of the first duct to reduce the apparent height of the opening of the second duct to a value which is less than "L" whenever the moving member is retracted into the housing, and it prevents the blade of a tool 19 from being inserted into the second operating duct unless the blade is inserted flat.

In this case, the facet 35 is parallel to the direction of displacement of the moving member and it is adjacent to the plane bearing surface 34.

The blade of the tool 19 then comes into abutment against the facet 35 if the blade is presented in any way other than parallel to the plane bearing surfaces 20 and 34, with proper presentation being shown in the right-hand side of FIG. 1 with the moving member 2' being in its low or fiber-clamping position.

Rotation through a quarter-turn causes the plane faces of the tool blade to bear against the convex bearing surfaces 21 and 35, thereby moving these bearing surfaces away from each other and thus displacing the moving member so as to cause it to take up the projecting figure shown to the left of FIG. 1.

In this limiting position the fiber-passing duct 31 of the moving member 2 has its longitudinal axis aligned with the longitudinal axis of the inlet duct 9, thereby enabling a fiber to be inserted beneath the clamping slot 32, and this is indicated visually by the moving element 2 projecting outside the housing 1 into which it is retracted when in its second limiting position.

As above, insertion of the blade of a tool 19 in any position other than sideways is prevented by the presence of the convex bearing surface 34 in the moving member concerned which reduces the apparent opening of the tube then formed by the two operating ducts and prevents any other insertion of said blade.

Rotating the blade of the tool through a quarter-turn in the opposite direction to that mentioned above serves to move the plane bearing surfaces 20 and 34 away from each other under the action of the longitudinal edges of the blade, and consequently retracts the corresponding moving member into the housing. This retraction movement corresponds to the movement for clamping a fiber in the corresponding slot 32.

Naturally the rapid fixing device in accordance with the invention requires the use of a standard tool blade of given cross-section.

A fiber whose core has previously been stripped over a determined length is rapidly fixed by performing the following two steps:

firstly, the fiber is inserted through the inlet duct 9 from one end after the moving member 2 has been previously placed in a position such as that shown to the left of FIG. 1 by appropriately rotating the blade of the tool 19 inserted into the operating ducts, with the core of the fiber penetrating into the middle receptacle 9B5 up to the middle thereof under the well 11A, and with the sheath of the fiber coming into abutment against the end of the sheath receptacle, e.g. 9A4; and secondly, the blade 19 which has been left in place or which has been reinserted through the operating-ducts is rotated through a reverse quarter-turn, thereby retracting the corresponding member which then clamps the fiber.

Connecting two optical fibers together in the terminal block shown in FIG. 1 is performed by successively inserting and fixing two fibers each of which is inserted via one of the openings of the inlet duct.

The connection per se of the fiber cores is performed by putting the cores into end-to-end relationship in conventional manner and is not described herein.

We claim:

1. A fixing device for rapidly fixing a tubular element in an apparatus housing, said housing including:
    a fixed inlet duct via which the tubular element penetrates into the housing and in which it is positioned;
    a guide extending through the inlet duct; and
    a slide guide type moving member received in the guide, said moving member including a slot which is oriented transversely relative to the inlet duct, and said moving member overlapping the tubular element when inside the duct in such a manner as to fix the tubular element by wedging it inside the slot when said moving member is displaced within the guide from an initial position in which the tubular element is free to slide along the inlet duct to a final position in which the tubular element is fixed inside the housing by being clamped in said slot,
    said fixing device comprising an arrangement for displacing said moving member in translation along its guide under the effect of a rectangular cross-section blade of a tool of the screwdriver type being rotated through a fraction of a turn, the improvement wherein;
    said arrangement includes first and second operating ducts for passing the blade of the tool, the second duct extending through the moving member, the first duct extending through the housing from an external orifice enabling said tool blade to be inserted through both operating ducts which enable the tool blade to press sideways against different portions of the inside walls of each of said ducts as a function of the axial rotation position of the blade, in such a manner that the sideways thrust of the blade on an internal wall portion of each of the two operating ducts causes the two wall portions concerned to move apart and to thereby give rise to translation of the moving member in one direction or the other whenever an axial rotary torque is applied to the tool blade, and in the same direction as said torque.

2. A rapid fixing device according to claim 1, wherein the internal wall portions of the first and second operating ducts which serve as side bearing surfaces for the blade of the tool to provide translation of the moving member comprise at least: firstly two plane bearing surfaces each made in a different one of the operating ducts and bearing against opposite sides of the blade of the tool which bears against them via its longitudinal sides for one of the two opposite direction translations of said moving member; and secondly two convex bearing surfaces each made in a different one of the operating ducts and pressing against opposite sides of the blade of the tool which bears against them via its opposite faces for the other translation direction of said moving member, said convex bearing surfaces being disposed sideways relative to the plane bearing surfaces in the operating ducts.

3. A rapid fixing device according to claim 2, wherein the first operating duct includes an orifice whose opening limits the cross-section of the blade of the tool to a predetermined value and extending beyond the guide into which it opens out by means of a portion whose cross-section is shaped in such a manner as to allow two-way axial rotation of the blade of the tool through only one-quarter of a turn between two determined positions.

4. A rapid fixing device according to claim 2, wherein the portion of the first operating duct in which the bearing surfaces of the displacement arrangement belonging to said first operating duct are situated allow the blade of a tool to rotate axially through a quarter-turn, to enable said tool blade to pass between a first position in which one of its two faces is pressed against the plane bearing surface of said first operating duct, to a second position at right angles in which a longitudinal edge of said tool blade faces said plane bearing surface at its center.

5. A rapid fixing device according to claim 2, wherein the first operating duct co-operates with the second operating duct to provide only one specific insertion position for the blade of the tool for each limiting position of the moving member.

6. An optical fiber terminal block comprising at least two rapid fixing devices in a single housing for rapidly fixing two optical fibers end-to-end each having a core and an external sheath, said housing including: fixed inlet ducts via which the optical fibers penetrate into the housing and in which they are positioned; a guide extending through each inlet duct; a slide type moving member received in each guide, said moving member including a slot which is oriented transversely relative to a respective inlet duct, said moving member overlapping the optical fiber when inside the duct in such a manner as to fix the optical fiber by wedging it inside the slot when said moving member is displaced within the respective guide from an initial position in which the optical fiber is free to slide along the inlet duct to a final position in which the optical fiber is fixed inside the housing by being clamped in said slot, each fixing device comprising an arrangement for displacing said moving member in translation along its guide under the effect of a rectangular cross-section blade of a tool of the screwdriver type being rotated through a fraction of a turn, said arrangement including two ducts for passing the blade of the tool, said ducts referred to as "first" and as "second" operating ducts respectively, with the second duct being provided through the moving member and with the first duct being provided through the housing from an external orifice enabling said tool blade to be inserted through both operating ducts which enable the tool blade to press sideways against different portions of the inside walls of each of said first and second ducts as a function of the actual rotation position of the blade, in such a manner that sideways thrust of the blade on an internal wall portion of each of the two operating ducts causes the two wall portions concerned to move apart and thereby gives rise to translation of the moving member in one direction or the other whenever an axial rotary torque is applied to the tool blade and in the same direction as said torque, said rectilinear inlet ducts receiving the two fibers end-to-end with their cores and their sheaths respectively received in a common middle receptacle and in two sheath receptacles, whereby, said at least two rapid fixing devices in said single housing in which the fibers are individually fixed by the action of a corresponding slotted moving member moving astride thereover so as to clamp its optical fiber sheath when said moving member is displaced in a respective guide which intersects the sheath receptacle concerned between an initial position enabling the sheath of the fiber concerned to be inserted into the fiber receptacle, and a final position in which the fiber is fixed by its sheath by being clamped by the corresponding moving member of the housing.

7. A terminal block according to claim 6, wherein the housing is made up of two joinable halves which are at least approximately similar and in which the inlet duct, the guides, and the first operating ducts are made in the form of complementary half-ducts.

8. A terminal block according to claim 7, wherein each moving element is pressed against a bearing face against which it slides by means of a pusher device comprising pairs of resilient tabs bearing against two slightly sloping ramps enabling the pressure of said moving member to be increased when said moving member is displaced in translation from its initial position to its final position.

9. A terminal block according to claim 8, wherein the clamping slot is inclined relative to the sheath receptacle into which it penetrates in such a manner as to tend to urge the fiber that it clamps towards the middle receptacle.

* * * * *